(12) United States Patent
Crooks

(10) Patent No.: US 7,617,979 B2
(45) Date of Patent: Nov. 17, 2009

(54) METHOD OF DETERMINING FAILURE OF AN RFID LABEL READER

(75) Inventor: John F. Crooks, Duluth, GA (US)

(73) Assignee: NCR Corporation, Dayton, OH (US)

( * ) Notice: Subject to any disclaimer, the term of this patent is extended or adjusted under 35 U.S.C. 154(b) by 797 days.

(21) Appl. No.: 11/265,809

(22) Filed: Nov. 3, 2005

(65) Prior Publication Data
US 2007/0095915 A1    May 3, 2007

(51) Int. Cl.
*G06K 7/08* (2006.01)
(52) U.S. Cl. ...................................... 235/451
(58) Field of Classification Search .................. 235/375, 235/451, 492
See application file for complete search history.

(56) References Cited

U.S. PATENT DOCUMENTS

2005/0077357 A1*   4/2005   Roux .......................... 235/451

FOREIGN PATENT DOCUMENTS

| EP | 0 759 597 A1 | 2/1997 |
|----|--------------|--------|
| EP | 1 515 261 A  | 3/2005 |
| FR | 2 776 444 A1 | 9/1999 |
| WO | WO 9948225 A1 * | 9/1999 |

* cited by examiner

*Primary Examiner*—Daniel A Hess
(74) *Attorney, Agent, or Firm*—Paul W. Martin

(57) ABSTRACT

A method of determining failure of an RFID label reader.

31 Claims, 4 Drawing Sheets

METHOD OF DETERMINING FAILURE OF AN RFID LABEL READER

BACKGROUND OF THE INVENTION

RFID technology provides an alternative to bar code reader technology for distinguishing and recording items for purchase. RFID may result in labor savings to retailers, since it may obsolete conventional methods of identifying products.

RFID label readers are vulnerable to damage from normal use. For example, a forklift may crush an antenna.

RFID label readers are also vulnerable to attack. Unscrupulous employees may be tempted to disconnect an RFID label reader antenna or jam signals from RFID labels in order to take stolen items out of a building without detection.

Therefore, it would be desirable to provide a method of determining failure of an RFID label reader.

SUMMARY OF THE INVENTION

A method of determining failure of a radio frequency identification (RFID) label reader is provided.

DETAILED DESCRIPTION OF THE PREFERRED EMBODIMENT

Figure 1:
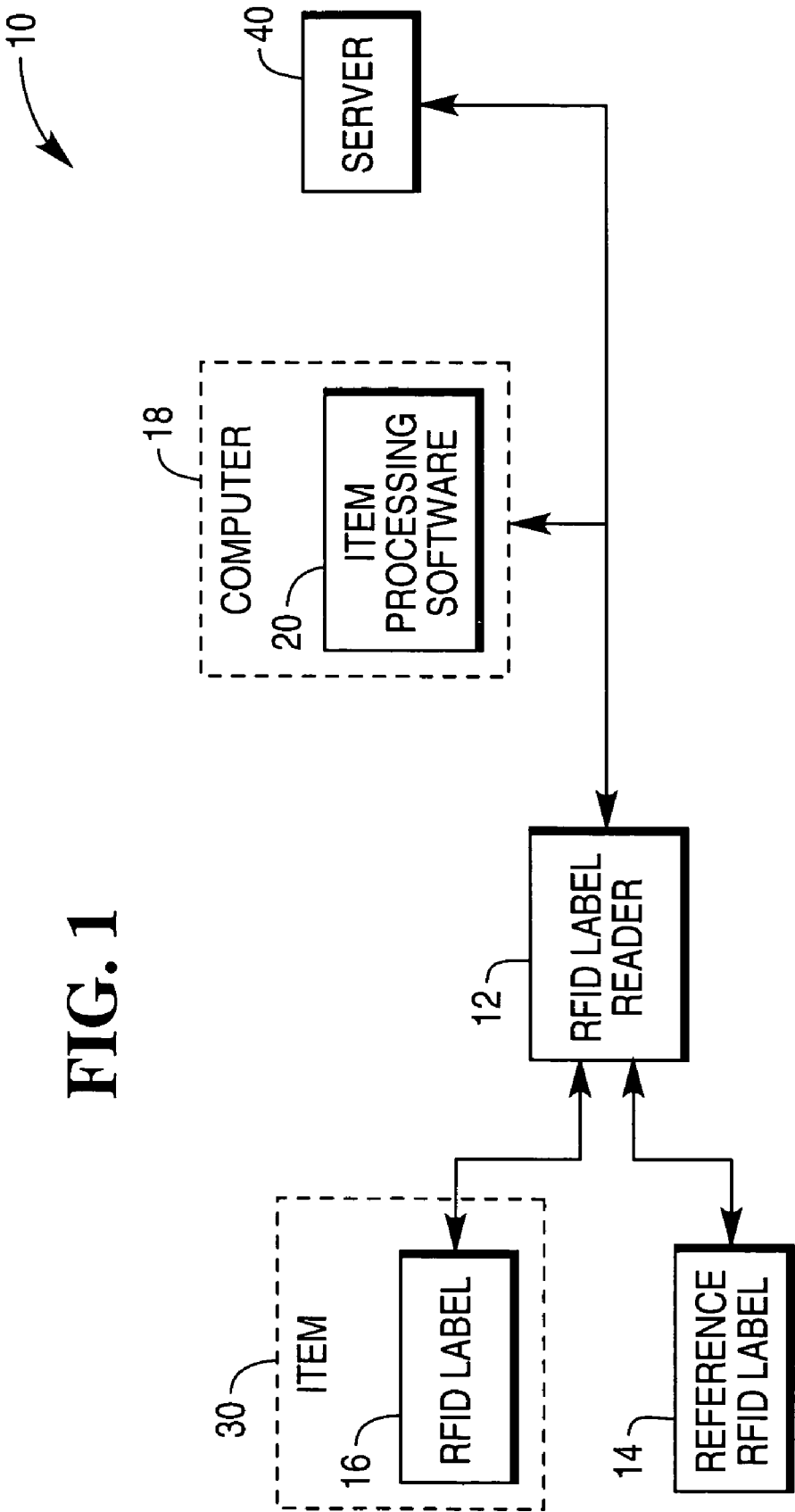
FIG. 1 is a block diagram of a system which reads frequency identification (RFID) labels.

Referring now to FIG. 1, system 10 includes radio frequency identification (RFID) label reader 12 and reference RFID label 14.

RFID label reader 12 emits a signal and receives a return signal from RFID label 16 on item 30. The return signal contains information stored within RFID label 16. RFID label reader 12 sends the information to computer 18.

RFID label reader 12 also polls reference RFID label 14 and sends the reference information to computer 18. If reference RFID label 14 fails to respond after a predetermined number of attempts, RFID label reader 12 or computer 18 initiates a problem alert via Simple Network Management Protocol (SNMP), electronic mail (E-mail), server console popup message, error log, or other means.

RFID label reader 12 or reference RFID label 14 may also contain circuitry for attenuating return signals if reference RFID label 14 is located within or extremely close to RFID label reader 12 and false positives occur due to direct coupling with the RFID label reader 12 internal circuitry. Attenuation may be variable to simulate various distances between reference RFID label 14 and RFID label reader 12.

Another method of determining whether RFID label reader 12 is fully functional involves increasing attenuation of the return signal from reference RFID label 14 until RFID label reader 12 can no longer receive a reliable response. RFID label reader 12 then compares this threshold attenuation value to a reference attenuation value established at the time of installation. If the two values are different, then RFID label reader 12 reports a problem.

RFID label reader 12 may be a network peripheral, controllable by computer 18 or other network computer. Alternatively, RFID label reader 12 may be coupled only to computer 18 through a serial or other connection.

Reference information stored within reference RFID label 14, for example, a unique serial number, may be stored within a memory of RFID label reader 12, for example, at the time of manufacture for later diagnostic use.

Reference RFID label 14 is fixed in known proximity to RFID label reader 12. For example, reference RFID label 14 may be integrated into RFID label reader 12, such as within an antenna housing of RFID label reader 12. If there is more than one RFID label reader 12 in a given installation, reference RFID label 14 may be optionally mounted to and controlled by a first RFID label reader 12 in order to test an adjacent second RFID label reader 12.

As another mounting alternative, reference RFID label 14 may be affixed to a wall. Other locations with reading distance of RFID label reader 12 are also envisioned.

Computer 18 executes item processing software 20, which receives RFID label information from RFID label reader 12. Computer 18 may include a transaction computer, an inventory computer, or any other computer that must process items 30.

Figure 2:
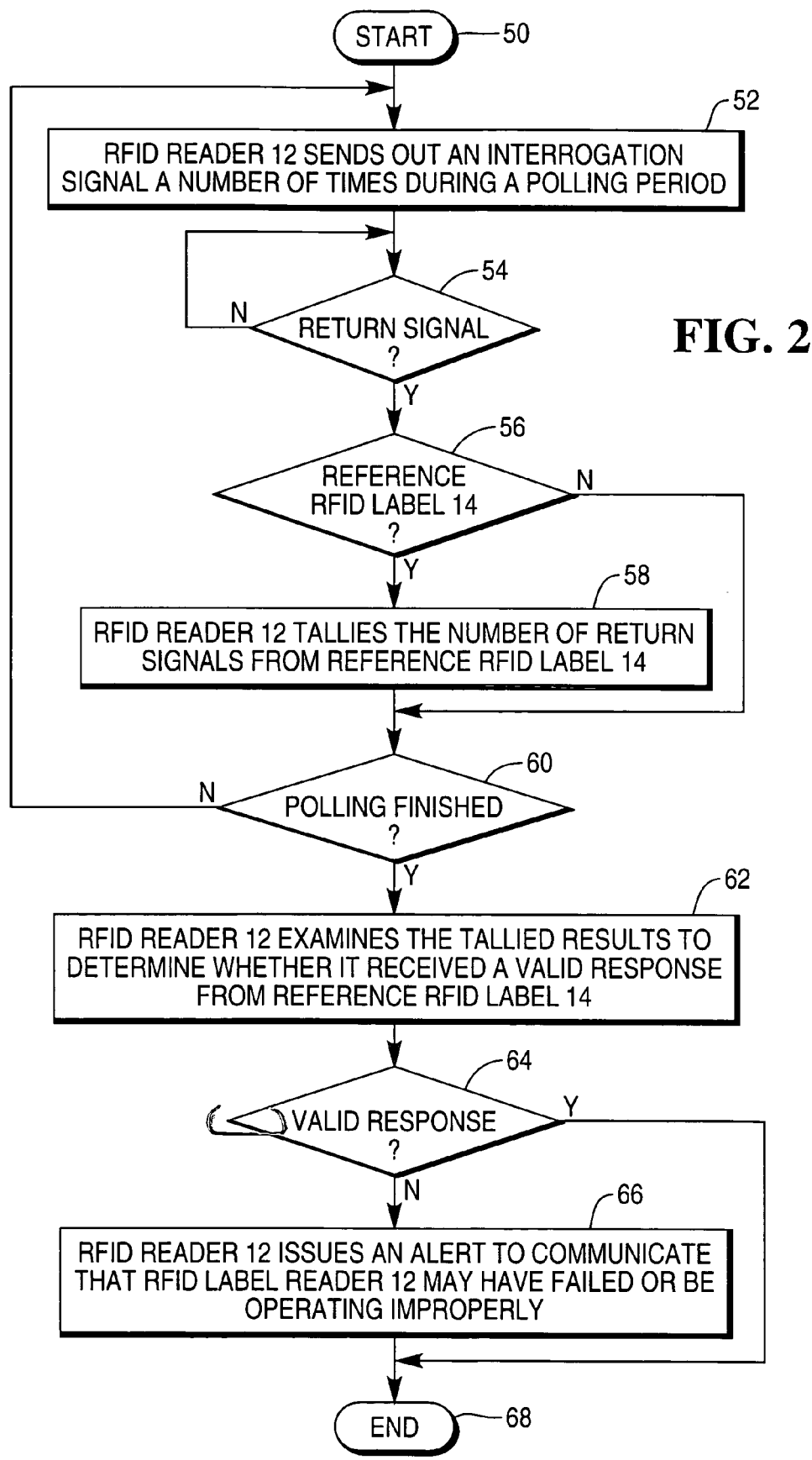
FIG. 2 is a flow diagram illustrating an example method of determining failure of an RFID label reader.

In FIG. 2, an example method of determining a failure of RFID reader 12 is illustrated in more detail beginning with START 50.

In steps 52-60, RFID reader 12 completes a polling period looking for return signals from reference RFID label 14.

In step 52, RFID reader 12 sends out an interrogation signal.

In step 54, RFID reader 12 waits for a return signal. If RFID reader 12 receives a return signal, operation continues to step 56. RFID reader 12 may receive many return signals, including a return signal from reference RFID label 14 and item RFID labels 16.

In step 56, RFID reader 12 determines whether the return signal is from reference RFID label 14. RFID reader 12 compares information in the return signal to reference information associated with reference RFID label 14 stored in the memory of RFID label reader 12. If so, operation proceeds to step 58. Otherwise, operation proceeds to step 60.

In step 58, RFID reader 12 tallies the number of return signals from reference RFID label 14. Operation continues to step 60.

In step 60, RFID reader 12 determines whether the polling period should end. An example polling period may loop through steps 52-60 about ten to twenty times in order to minimize false positives. If polling should continue, operation returns to step 52. Otherwise, operation continues to step 62.

In step 62, RFID reader 12 examines the tallied results to determine whether it received a response from reference RFID label 14. If so, operation ends at step 66. Otherwise, operation continues at step 64.

In step 64, RFID reader 12 or computer 18 issues an alert indicating that RFID label reader 12 may have failed or be operating improperly. For example, RFID reader 12 may issue the alert via SNMP, E-mail, server console popup message, error log, or other means.

Operation ends at step 66.

Figure 3A:
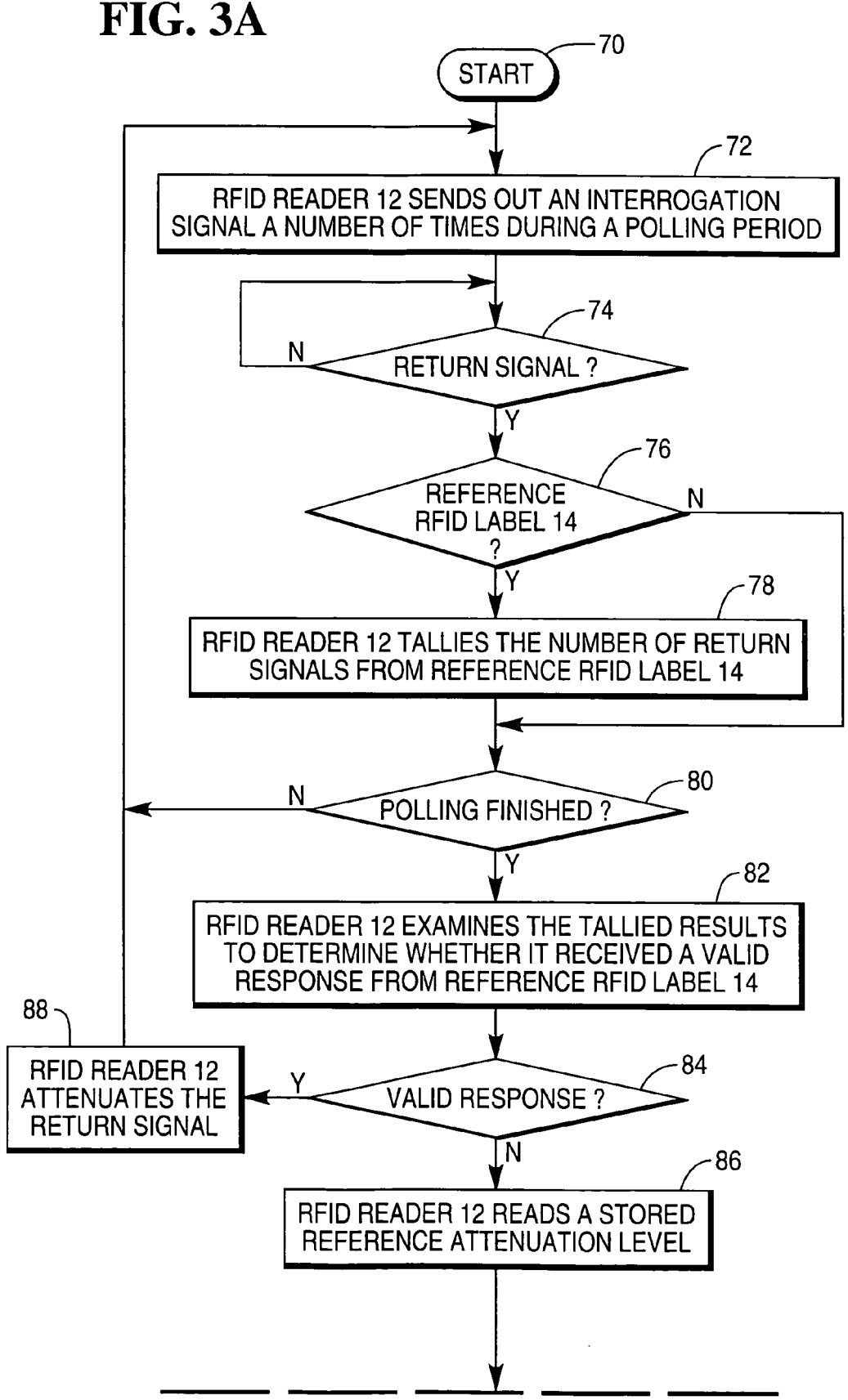
FIGS. 3A and 3B are a flow diagram illustrating another example method of determining failure of an RFID label reader.
Figure 3B:
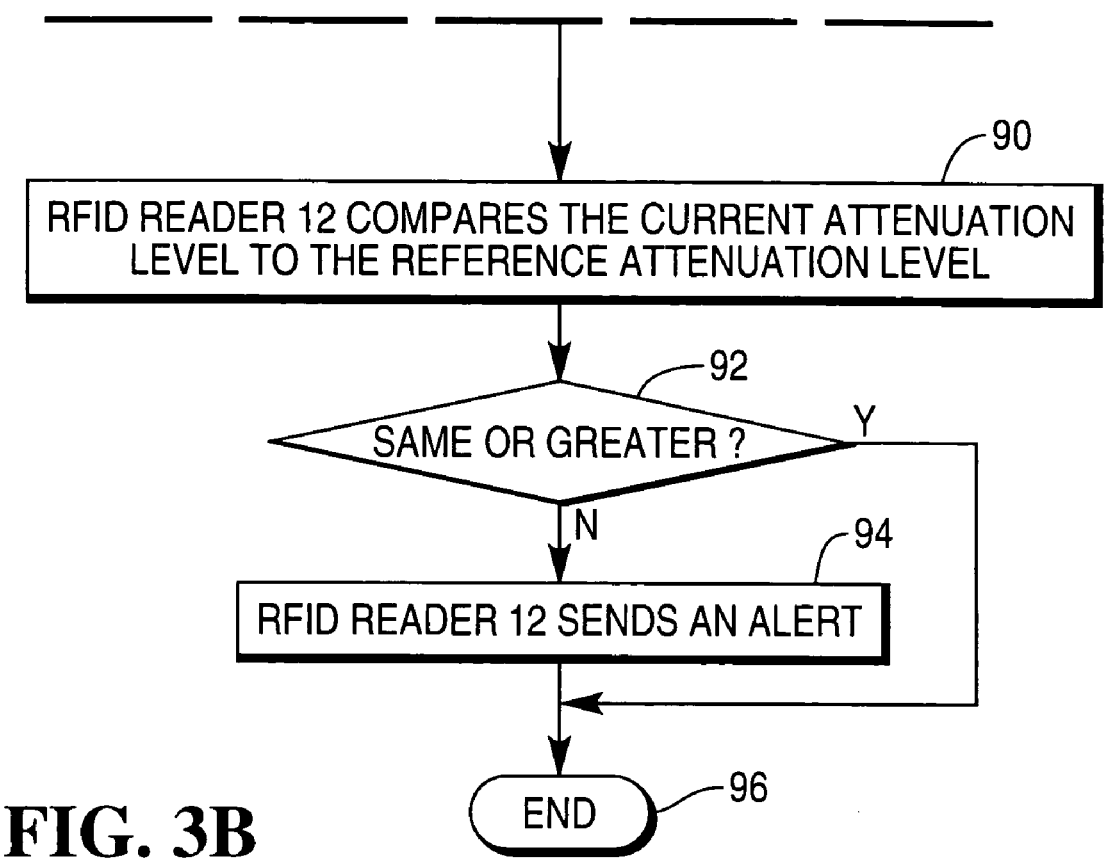

In FIG. 3, another example method of determining a failure of RFID reader 12 is illustrated in more detail beginning with START 70.

In steps 72-80, RFID reader 12 completes a polling period similar to the one in FIG. 2.

In step 72, RFID reader 12 sends out an interrogation signal.

In step 74, RFID reader 12 waits for a return signal from reference RFID label 14. If RFID reader 12 receives a return signal, operation continues to step 76.

In step 76, RFID reader 12 determines whether the return signal is from reference RFID label 14. RFID reader 12 compares information in the return signal to reference information associated with reference RFID label 14 stored in the memory of RFID label reader 12. If so, operation proceeds to step 78. Otherwise, operation proceeds to step 80.

In step 78, RFID reader 12 tallies the number of return signals from reference RFID label 14. Operation continues to step 60.

In step 80, RFID reader 12 determines whether the polling period should end. An example polling period may loop through steps 52-60 about ten to twenty times in order to minimize false positives. If polling should continue, operation returns to step 72. Otherwise, operation continues to step 82.

In step 82, RFID reader 12 examines the tallied results to determine whether it received a response from reference RFID label 14. If so operation continues to step 86. If not, operation continues at step 88.

In step 86, RFID reader 12 attenuates the return signal. An example attenuation level is the current attenuation plus an additional attenuation of 3 dB. Operation returns to step 72 to continue polling. During successive polling periods, RFID reader 12 progressively attenuates the return signal until it fails to receive a valid response and operation proceeds to step 88.

In step 88, RFID reader 12 reads a stored reference attenuation level, which it obtained during a previous test.

In step 90, RFID reader 12 compares the current attenuation level to the reference attenuation level. If the current attenuation level is the same or greater than the reference attenuation level, operation ends at step 94. Otherwise, operation continues to step 92.

In step 92, RFID reader 12 or computer 18 issues an alert indicating that RFID label reader 12 may have failed. An attenuation level less than the reference attenuation level is an indication that RFID reader 12 is either not receiving a strong enough signal from reference RFID label 14 or its receiver sensitivity is much lower due to failure.

In step 94, operation ends.

Although particular reference has been made to certain embodiments, variations and modifications are also envisioned within the spirit and scope of the following claims.

What is claimed is:

1. A method comprising:
   a) polling a reference radio frequency identification (RFID) label located adjacent to an RFID label reader by the RFID label reader;
   b) attenuating return signals from the reference RFID label, including varying attenuation to simulate various distances between the reference RFID label and the RFID label reader; and
   c) issuing an alert to a computer indicative of a failure of the RFID label reader if the RFID label reader fails to receive a response from the reference RFID label.

2. The method of claim 1, wherein step a) comprises:
   a-1) sending interrogation signals by the RFID label reader;
   a-2) receiving return signals;
   a-3) determining first return signals received from the reference RFID label;
   a-4) tallying a count of the first return signals.

3. The method of claim 2, wherein step a-3) comprises:
   a-3-A) comparing information in the return signals to reference information associated with the reference RFID label and stored in a memory of the RFID label reader.

4. The method of claim 1, wherein step c) comprises:
   c-1 issuing the alert via simple network management protocol.

5. The method of claim 1, wherein step c) comprises:
   c-1) issuing the alert via electronic mail.

6. The method of claim 1, wherein step c) comprises:
   c-1) issuing the alert via a server console popup message.

7. The method of claim 1, wherein step c) comprises:
   c-1) issuing the alert by adding an entry in an error log of the computer.

8. The method of claim 1, wherein step b) comprises:
   b-1) increasing attenuation to a threshold attenuation level at which the RFID label reader can no longer receive a reliable response from the reference RFID label; and
   b-2) comparing the threshold attenuation level to a previously obtained reference attenuation level.

9. The method of claim 8, wherein step c) comprises:
   c-1) issuing the alert if the threshold attenuation level substantially differs from the reference attenuation level.

10. The method of claim 1, further comprising:
    d) disabling the reference RFID label to prevent unwanted chatter after polling is finished.

11. The method of claim 1,
    wherein step a) is initiated by a computer.

12. The method of claim 1,
    wherein step a) is initiated by the RFID label reader.

13. A method comprising:
    a) polling a reference radio frequency identification (RFID) label located adjacent to an RFID label reader by the RFID label reader;
    b) attenuating return signals from the reference RFID label, including increasing attenuation to a threshold attenuation level at which the RFID label reader can no longer receive a reliable response from the reference RFID label, and comparing the threshold attenuation level to a previously obtained reference attenuation level; and
    c) issuing an alert to a computer indicative of a failure of the RFID label reader if the RFID label reader fails to receive a response from the reference RFID label.

14. The method of claim 13, wherein step c) comprises:
    c-1) issuing the alert if the threshold attenuation level substantially differs from the reference attenuation level.

15. A system comprising:
    a radio frequency identification (RFID) label reader; and
    a reference RFID label located adjacent an RFID label reader;
    wherein the RFID label reader polls the reference RFID label, attenuates return signals from the reference RFID label, varies attenuation to simulate various distances between the reference RFID label and the RFID label reader, and issues an alert to a computer indicative of a failure of the RFID label reader if the RFID label reader fails to receive a response from the reference RFID label.

16. The system of claim 15, wherein the RFID label reader comprises a housing and wherein the reference RFID label is located within the housing.

17. The system of claim 15, wherein the RFID label reader sends interrogation signals, receives return signals, determines first return signals received from the reference RFID label, and tallies a count of the first return signals during polling.

18. The system of claim 17, wherein the RFID label reader compares information in the return signals to reference information associated with the reference RFID label and stored in a memory of the RFID label reader to determine the first return signals.

19. The system of claim 15, wherein the RFID label reader issues the alert via simple network management protocol.

20. The system of claim 15, wherein the RFID label reader issues the alert via electronic mail.

21. The system of claim 15, wherein the RFID label reader issues the alert via a server console popup message.

22. The system of claim 15, wherein the RFID label reader issues the alert by adding an entry in an error log of the computer.

23. The system of claim 15, wherein the RFID label reader increases attenuation to a threshold attenuation level at which the RFID label reader can no longer receive a reliable response from the reference RFID label, compares the threshold attenuation level to a previously obtained reference attenuation level.

24. The system of claim 23, wherein the RFID label reader issues the alert if the threshold attenuation level substantially differs from the reference attenuation level.

25. The system of claim 15, wherein the reference RFID label also attenuates return signals from the reference RFID label.

26. The system of claim 25, further comprising a wireless communicator for controlling the reference RFID label.

27. The system of claim 15, wherein the RFID label reader disables the reference RFID label to prevent unwanted chatter after polling is finished.

28. The system of claim 15, wherein the RFID label reader initiates polling.

29. The system of claim 15, wherein the computer initiates polling.

30. A system comprising:
  a radio frequency identification (RFID) label reader; and
  a reference RFID label located adjacent an RFID label reader;
  wherein the RFID label reader polls the reference RFID label, attenuates return signals from the reference RFID label, increases attenuation to a threshold attenuation level at which the RFID label reader can no longer receive a reliable response from the reference RFID label, compares the threshold attenuation level to a previously obtained reference attenuation level, and issues an alert to a computer indicative of a failure of the RFID label reader if the RFID label reader fails to receive a response from the reference RFID label.

31. The system of claim 30, wherein the RFID label reader issues the alert if the threshold attenuation level substantially differs from the reference attenuation level.

* * * * *